US011323357B1

(12) United States Patent
Mahadevan et al.

(10) Patent No.: US 11,323,357 B1
(45) Date of Patent: May 3, 2022

(54) ACCESSING VARYING ROUTE ATTRIBUTE STATES DURING ROUTING POLICY APPLICATION ON NETWORK DEVICES

(71) Applicant: Arista Networks, Inc., Santa Clara, CA (US)

(72) Inventors: Satish Mahadevan, San Ramon, CA (US); Matthieu Loriol, Vancouver (CA); Keon Vafai, Milpitas, CA (US); Thomas Giarratana, Palo Alto, CA (US); Kyle Gonsalves, Palo Alto, CA (US)

(73) Assignee: Arista Networks, Inc., Santa Clara, CA (US)

( * ) Notice: Subject to any disclaimer, the term of this patent is extended or adjusted under 35 U.S.C. 154(b) by 0 days.

(21) Appl. No.: 17/218,231

(22) Filed: Mar. 31, 2021

(51) Int. Cl.
*H04L 12/721* (2013.01)
*H04L 45/12* (2022.01)
*H04L 45/02* (2022.01)
*H04L 45/24* (2022.01)
*H04L 45/00* (2022.01)

(52) U.S. Cl.
CPC ............ *H04L 45/123* (2013.01); *H04L 45/02* (2013.01); *H04L 45/22* (2013.01); *H04L 45/24* (2013.01)

(58) Field of Classification Search
CPC ................................ H04L 45/02; H04L 45/22
See application file for complete search history.

(56) References Cited

U.S. PATENT DOCUMENTS

| 9,330,109 | B2 * | 5/2016 | Bone ..................... G06F 16/185 |
| 9,929,899 | B2 * | 3/2018 | Kontz ..................... H04L 47/11 |
| 10,135,683 | B1 * | 11/2018 | Medved .............. H04L 41/0836 |
| 10,452,453 | B1 * | 10/2019 | Kumar .................. G06F 3/0647 |
| 10,740,156 | B1 * | 8/2020 | Kumar .................. G06F 9/5083 |
| 11,163,721 | B1 * | 11/2021 | Mahuli ............... G06F 11/1451 |
| 2010/0284403 | A1 * | 11/2010 | Scudder .................. H04L 45/04 370/392 |
| 2013/0132542 | A1 * | 5/2013 | Zhang ..................... H04L 45/04 709/223 |
| 2014/0189429 | A1 * | 7/2014 | Gill ...................... G06F 11/1484 714/19 |
| 2015/0163158 | A1 * | 6/2015 | Ryland ................ H04L 41/0893 709/225 |
| 2016/0080211 | A1 * | 3/2016 | Anand ................ H04L 12/4641 709/224 |

(Continued)

OTHER PUBLICATIONS

Tian, Zhihong, et al. "A data-driven method for future Internet route decision modeling." Future Generation Computer Systems 95 (2019): 212-220.*

(Continued)

*Primary Examiner* — Jimmy H Tran
(74) *Attorney, Agent, or Firm* — Chamberlain, Hrdlicka, White, Williams & Aughtry, PC

(57) ABSTRACT

A method for enabling access to varying route attribute states during routing policy application on network devices. Concerning routing policy configurations, it is currently possible to evaluate network routes based on a singular state of one or more route attributes. In some scenarios, however, access to more than one state of the route attribute(s) is desirable. In addressing these scenarios, the disclosed method introduces state namespaces through which different states of the routing attribute(s) are maintained and accessed.

20 Claims, 15 Drawing Sheets

(56) References Cited

U.S. PATENT DOCUMENTS

| | | | | |
|---|---|---|---|---|
| 2017/0031776 | A1* | 2/2017 | Ren | G06F 11/1438 |
| 2017/0257290 | A1* | 9/2017 | Ogielski | H04L 45/00 |
| 2018/0109450 | A1* | 4/2018 | Filsfils | H04L 45/74 |
| 2018/0191669 | A1* | 7/2018 | Barton | H04L 45/02 |
| 2018/0219790 | A1* | 8/2018 | Azgin | H04L 45/20 |
| 2019/0179805 | A1* | 6/2019 | Prahlad | G06F 16/1827 |
| 2019/0354302 | A1* | 11/2019 | Enz | G06F 3/0622 |
| 2019/0372870 | A1* | 12/2019 | Spirt | G06F 11/1446 |
| 2019/0394088 | A1* | 12/2019 | Narayanan | H04L 41/0816 |
| 2020/0007442 | A1* | 1/2020 | Ravindran | H04L 45/586 |
| 2020/0007582 | A1* | 1/2020 | Dixit | H04L 63/20 |
| 2020/0007584 | A1* | 1/2020 | Dixit | H04L 43/08 |
| 2020/0104390 | A1* | 4/2020 | Bhagwat | G06F 3/0661 |
| 2020/0280502 | A1* | 9/2020 | Spirt | H04L 43/08 |
| 2020/0379966 | A1* | 12/2020 | Wu | G06F 16/29 |
| 2021/0132972 | A1* | 5/2021 | Gupta | G06F 3/0647 |
| 2021/0135982 | A1* | 5/2021 | Chaturmohta | H04L 43/10 |
| 2021/0344594 | A1* | 11/2021 | Mendez | H04L 45/42 |
| 2021/0359929 | A1* | 11/2021 | Cronin | H04L 45/02 |

OTHER PUBLICATIONS

Su, Shen, et al. "Quantifying AS-level routing policy changes." 2014 IEEE International Conference on Communications (ICC). IEEE , 2014.*

Wang, Anduo, et al. "Reduction-based formal analysis of bgp instances." International Conference on Tools and Algorithms for the Construction and Analysis of Systems. Springer, Berlin, Heidelberg, 2012.*

Kakarla, Siva Kesava Reddy, et al. "Finding network misconfigurations by automatic template inference." 17th {USENIX} Symposium on Networked Systems Design and Implementation ({NSDI} 20). 2020.*

* cited by examiner

ACCESSING VARYING ROUTE ATTRIBUTE STATES DURING ROUTING POLICY APPLICATION ON NETWORK DEVICES

BACKGROUND

Concerning routing policy configurations, it is currently possible to evaluate network routes based on a singular state of one or more route attributes. In some scenarios, however, access to more than one state of the route attribute(s) is desirable.

BRIEF DESCRIPTION OF DRAWINGS

FIGS. 6A-6H show an exemplary scenario in accordance with one or more embodiments of the disclosure.

DETAILED DESCRIPTION

Specific embodiments will now be described with reference to the accompanying figures.

In general, embodiments of the disclosure relate to a method for enabling access to varying route attribute states during routing policy application on network devices. Concerning routing policy configurations, it is currently possible to evaluate network routes based on a singular state of one or more route attributes. In some scenarios, however, access to more than one state of the route attribute(s) is desirable. In addressing these scenarios, the disclosed method introduces state namespaces through which different states of the routing attribute(s) are maintained and accessed.

Figure 1:
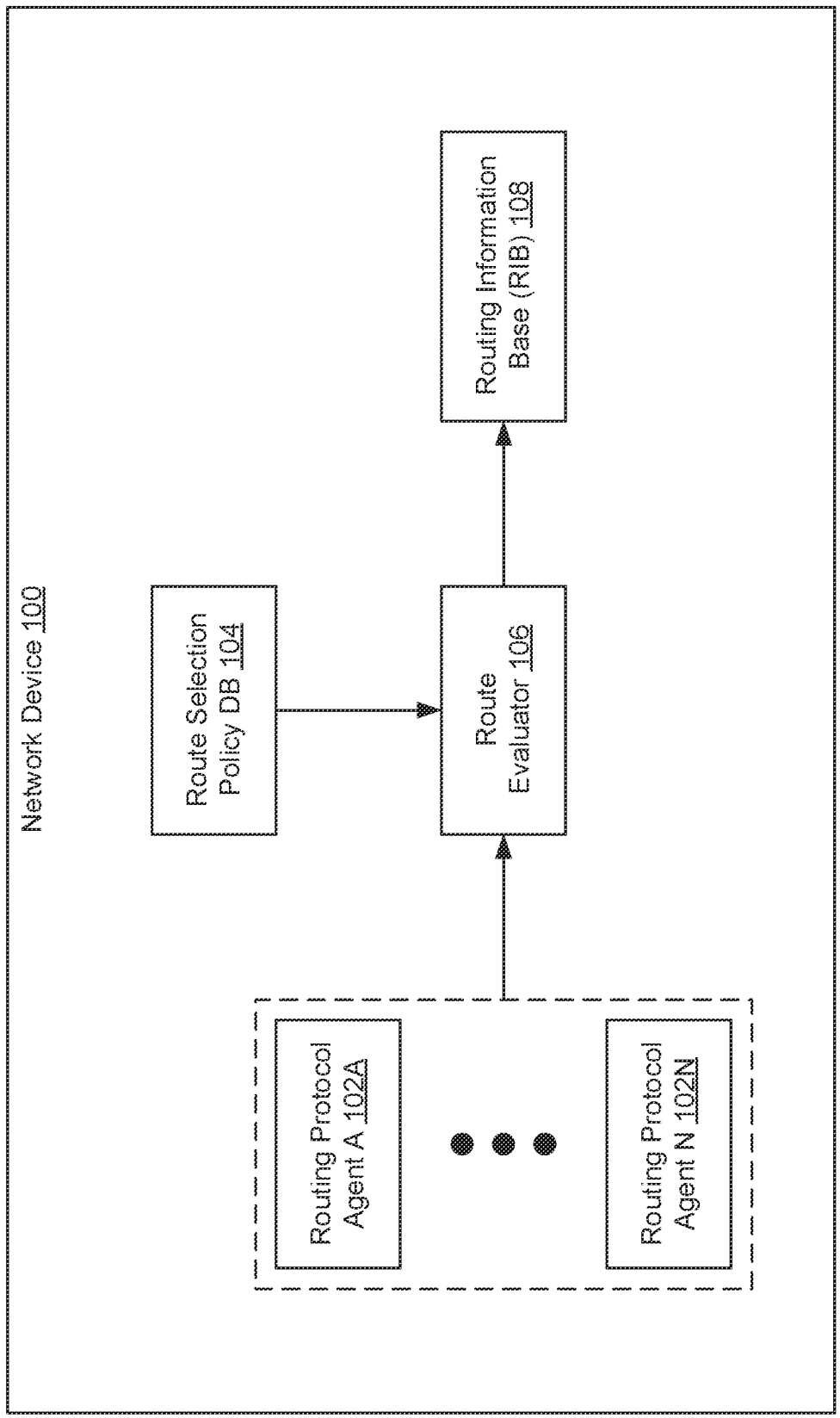
FIG. 1 shows a network device in accordance with one or more embodiments of the disclosure.

FIG. 1 shows a network device in accordance with one or more embodiments of the disclosure. The network device (100) may include, but is not limited to, any number of routing protocol agents (102A-102N), a route selection policy database (DB) (104), a route evaluator (106), and a routing information base (RIB) (108). Each of these network device (100) components is described below.

In one embodiment of the disclosure, the network device (100) may represent a physical device that includes and/or is operatively connected to persistent storage (not shown), memory (e.g., random access memory (RAM)) (not shown), one or more computer processors (e.g., integrated circuitry) (not shown), and at least one physical network interface (not shown) (which may also be referred to as a port), which may provide connections (i.e., links) to other devices (e.g., computing devices or end points, other network devices, etc.). The network device (100) may also include any number of additional components (not shown), such as, for example, network chips, field programmable gate arrays (FPGAs), application specific integrated circuits (ASICs), indicator lights (not shown), fans (not shown), etc. In another embodiment of the disclosure, the network device (100) may represent a virtual instance of a network device. In such an embodiment, the network device (100) may, for example, represent a virtual instance of a router that executes within a hypervisor that may be itself executing using underlying physical hardware.

In one embodiment of the disclosure, the network device (100) may include any software configured to perform various functions of the network device (100). Such software may, for example, execute using one or more computer processors of the network device (100), or any other hardware resource of the network device (100) capable of executing software. One example of such software may be an operating system (OS) (not shown). An OS may include any software and/or firmware for managing the resources (e.g., hardware, other software, etc.) of the network device (100). More specifically, an OS may represent a computer program, or a set of computer programs, which manage(s) all or any portion of the other software (e.g., applications, agents, utilities, etc.) on the network device (100), as well as all or any portion of the hardware thereon. Management by an OS may include, but is not limited to, scheduling, hardware allocation, application execution, network access, and file system implementation and data access. An OS may also manage and enforce settings and permissions customized for specific applications running within the OS. Further, an OS may provide an environment in which agents (described below) may execute.

Examples of the network device (100) may include, but are not limited to, a network switch, a router, a multilayer switch, a fibre channel device, and an InfiniBand® device. Further, the network device (100) is not limited to the aforementioned specific examples.

In one embodiment of the disclosure, the network device (100) may include functionality to receive network traffic data units (e.g., frames, packets, tunneling protocol frames, etc.) at any of the network interfaces (i.e., ports) of the network device (100) and to process the network traffic data units. Processing a network traffic data unit may include, but is not limited to, a series of one or more table lookups (e.g., longest prefix match (LPM) lookups, forwarding equivalence class (FEC) looks, etc.) and corresponding actions (e.g., forward from a certain egress port, add a labeling protocol header, rewrite a destination address, encapsulate, etc.). Such a series of lookups and corresponding actions may be referred to as a pipeline, and may be, for example, programmed as a match-action pipeline. Examples of pipeline processing may include, but are not limited to, performing a lookup to determine: (i) whether to take a security action (e.g., drop the network traffic data unit); (ii) whether to mirror the network traffic data unit; and/or (iii) how to route/forward the network traffic data unit in order to transmit the network traffic data unit from an interface of the network device (100).

In one embodiment of the disclosure, the network device (100) may be part of a network (not shown). A network may refer to an entire network or any portion thereof (e.g., a logical portion of the devices within a topology of devices). A network may include a data center network, a local area network (LAN), a wide area network (WAN), a wireless network, a cellular phone network, or any other suitable network that facilitates the exchange of information from one part of the network to another. Further, a network may couple with or overlap, at least in part, with the Internet. A network may include a collection of devices (e.g., including the network device (100)), which collectively facilitate network connectivity for one or more operatively connected end points (e.g., computing devices, data storage devices, etc.) (not shown). Moreover, the network device (100) and other devices within a network may be arranged in a network topology (not shown), where a network topology refers to an arrangement of various devices within a network.

In one embodiment of the disclosure, the persistent storage and/or memory of the network device (100) may refer to, or include, one or more data repositories for storing any number of data structures that store any amount of data (i.e., information). A data repository may represent any type of storage unit and/or device (e.g., a file system, a database, a collection of tables, RAM, and/or any other storage mechanism) for storing data. Further, a data repository may include multiple different storage units and/or devices—each of which may or may not be of the same type or located at the same physical location.

In one embodiment of the disclosure, the persistent storage and/or memory of the network device (100) may be considered, in whole or in part, as non-transitory computer readable media, which store, at least in part, software and/or firmware.

Such software and/or firmware may include instructions which, when executed by the one or more computer processors, or other hardware (e.g., circuitry) of the network device (100), cause the computer processor(s) and/or other hardware components to perform operations in accordance with one or more embodiments of the disclosure. For example, the aforementioned operations may at least include the methods outlined and described in FIGS. 4 and 5A-5C, below, which are directed to context data object generation and route evaluation, respectively.

Such software and/or firmware instructions may be in the form of computer readable program code, which may, for example, be stored, in whole or in part, temporarily or permanently, on non-transitory computer readable media. Examples of the non-transitory computer readable media may include, but are not limited to, compact discs (CDs), digital versatile discs (DVDs), storage devices, diskettes, tapes, flash memory, physical memory, or any other non-transitory computer readable media.

In one embodiment of the disclosure, the network device (100) may include any number of agents (e.g., routing protocol agent(s) (102A-102N), route evaluator (106), etc.). An agent may represent any hardware (e.g., circuitry), software, firmware, or any combination thereof that includes functionality to perform any tasks or actions for which it was designed. Examples of agent functionality may include, but are not limited to: monitoring hardware; monitoring other software; monitoring log files; receiving information; parsing information; writing information (e.g., to hardware tables); performing repetitive tasks (e.g., data backup, memory management, etc.); providing an environment for a user to interact, locally or remotely, with hardware and/or software components of the network device (100); automatically adding data to certain types of fields; performing management functions; simulating other software and/or hardware; sending an/or receiving signals (e.g., beacon signals) to determine if a device is still in contact with another device; processing/interpreting information; sending/distributing information; any other task or action; or any combination thereof.

In one embodiment of the disclosure, an agent may represent a process, or a part of a process, may include one or more threads within one or more processes, and/or may be capable of creating additional threads. Further, an agent may operatively connect to volatile storage and/or non-volatile (or persistent) storage of the network device (100). Moreover, an agent may execute within an operating system, using one or more computer processors, of the network device (100).

In one embodiment of the disclosure, at least a portion of the agents of the network device (100) may be the routing protocol agent(s) (102A-102N). A routing protocol agent (102A-102N) may refer to an agent configured to implement a routing protocol. A routing protocol, in turn, may refer to a networking protocol directed to managing route information in a network. For example, a routing protocol may learn route information from neighbor network devices, store such route information, share route information with other neighbor network devices, and provide route information to other agents (e.g., the route evaluator (106)) for further processing. Furthermore, with respect to one or more embodiments of the disclosure, any routing protocol agent (102A-102N) may include functionality to at least perform the method outlined in FIG. 4, below, which is directed to context data object generation. In one embodiment of the disclosure, the routing protocol agent(s) (102A-102N) operatively connect to the route evaluator (106).

Examples of routing protocol agents may include, but are not limited to: a Border Gateway Protocol (BGP) agent; an Interior Gateway Protocol (IGP) agent (e.g., Open Shortest Path First (OSPF), Routing Information Protocol (RIP), Intermediate System to Intermediate System (IS-IS), Enhanced Interior Gateway Routing Protocol (EIGRP), etc.); and a static route agent.

In one embodiment of the disclosure, at least one of the agents of the network device (100) may be the route evaluator (106). The route evaluator (106) may refer to an agent configured to evaluate routes, which may or may not be used by the network device (100), based on route information thereof provided by the routing protocol agent(s) (102A-102N). The provided route information may take shape as context data objects (CDOs) (see e.g., FIG. 3). Briefly, a CDO may represent a data container (i.e., maintained within volatile storage or memory of the network device (100)) wherein a collection of state namespaces (see e.g., FIG. 2), pertinent to a given network route, may be stored. In turn, each state namespace may maintain a different state of a set of route attributes reflective of the given network route. To that extent, the route evaluator (106) may include functionality to at least perform the method outlined in FIGS. 5A-5C, below, which is directed to route evaluation using CDOs.

In one embodiment of the disclosure, the route evaluator (106) may be configured with, or may include functionality to obtain, one or more route selection policies in order to derive route evaluations. The route selection policy or policies may be directed to route selection for installation into the RIB (108), route selection for installation into a forwarding information base (FIB) (not shown), FEC management, route redistribution, route modification, route conservation, etc. Further, the route evaluator (106) may be configured with, or may include functionality to obtain, other policies than the aforementioned examples without departing from the scope of the disclosure.

In one embodiment of the disclosure, any route selection policy may refer to a sequence of statements, which when processed by the route evaluator (106) in conjunction with a CDO for a given route, enables the route evaluator (106) to derive an evaluation of the given route, and subsequently, perform an action on the given route based on the derived evaluation. Each of the statements in the sequence of statements may instruct the route evaluator (106) to perform a particular function. Examples of the particular function may include, but are not limited to: a route attribute lookup entailing the retrieval of a route attribute value for a given route attribute specified in a given state namespace (described below); a route attribute assignment entailing the update of a route attribute value for a given route attribute specified in a given state namespace; a route attribute snapshot call or invocation triggering the creation of a new (intermediate) state namespace (see e.g., FIG. 3); and a route action targeting a network route (e.g., the installation permission or denial of the network route into the RIB (108)). The particular function(s), specified in a/each statement of any route selection policy, is not limited to the aforementioned examples.

In one embodiment of the disclosure, the route evaluator (106) may operatively connect to the route selection policy DB (104). The route selection policy DB (104) may represent a data repository, which may be implemented in the memory and/or the persistent storage of the network device (100). Further, the route selection policy DB (104) may be populated with a collection of route selection policies (described above) stored therein by, for example, a network device (100) or network administrator. One or more route selection policies, accordingly, may be retrieved from the route selection policy DB (104), by the route evaluator (106), to be used in the derivation of route evaluations for one or more network routes.

In one embodiment of the disclosure, the route evaluator (106) may operatively connect to the RIB (108). The RIB (108) may represent a data structure, which may be implemented in the non-volatile memory and/or the persistent storage of the network device (100). Specifically, the RIB (108) may represent a data structure that stores information related to network routes, which may be statically configured, learned dynamically from a routing protocol agent (102A-102N), or relate to networks directly connected to the network device (100). Information relating to a given network route may be stored as a RIB entry in the RIB (108). The aforementioned information, pertinent to a given network route and stored in a given RIB entry, may include, but is not limited to, a destination subnet identifying a network, a next-hop to reach the network, an interface of the network device (100) connected to the next-hop, various metrics describing the given network route, and/or any other information relevant to the given network route. Furthermore, the route evaluator (106) may, at least in part, manage the RIB (108), which may include, for example, adding RIB entries, removing RIB entries, and/or modifying RIB entries.

While FIG. 1 shows a configuration of components, other network device (100) configurations may be used without departing from the scope of the disclosure.

Figure 2:
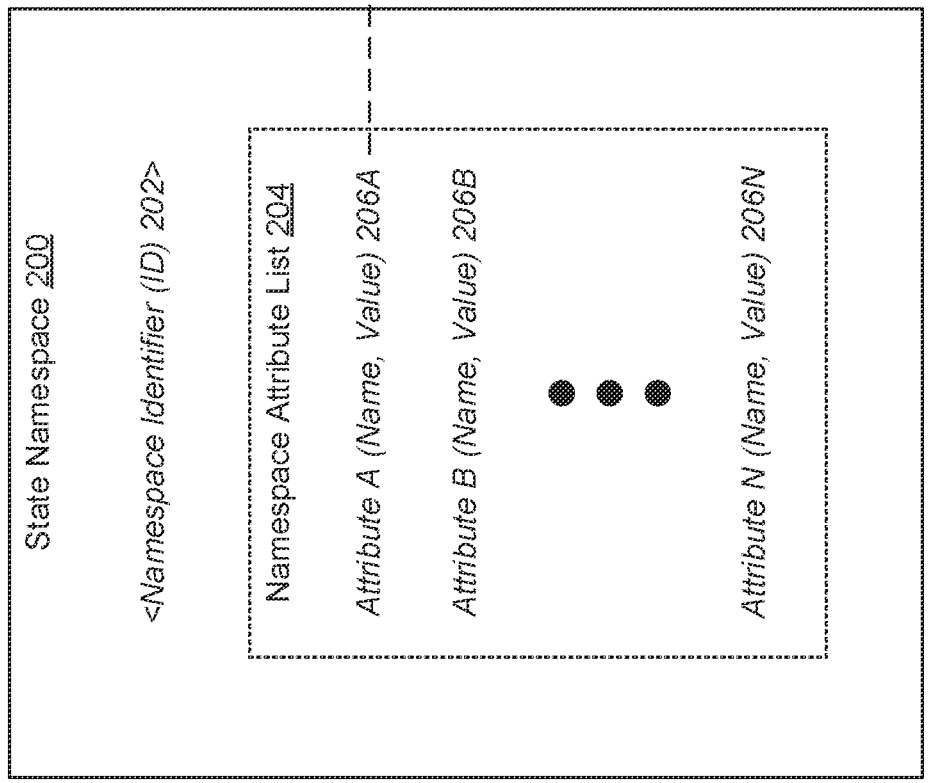
FIG. 2 shows a state namespace in accordance with one or more embodiments of the disclosure.

FIG. 2 shows a state namespace in accordance with one or more embodiments of the disclosure. A state namespace (200) may refer to an abstract container for storing a given snapshot (or state) of one or more route attributes recorded at a given point-in-time and pertaining to a given network route. Each route attribute, in turn, may refer to information characteristic of the given network route. A state namespace (200) may or may not include a namespace identifier (ID) (202), and may include a namespace attribute list (204). Each of these pieces of information is described below.

In one embodiment of the disclosure, the namespace ID (202) (if any) may refer to any arbitrary-length character string (e.g., including letters, numbers, symbols, or any combination thereof) that serves to uniquely identify the state namespace (200).

In one embodiment of the disclosure, the namespace attribute list (204) may refer to a data structure configured to store any number of route attributes—each in the form of a route attribute name-value pair (206A-206N)—associated with the given network route. A route attribute name-value pair (206A-206N) may represent an associated data representation that includes two related data elements—i.e., a route attribute name and a route attribute value. The route attribute name may refer to any arbitrary-length character string (e.g., including letters, numbers, symbols, or any combination thereof) that serves to uniquely identify a given route attribute. The route attribute value, on the other hand, may refer to any quantitative (e.g., numerical, interval, ratio, etc.) or qualitative (e.g., categorical, nominal, ordinal, etc.) state or measurement reflective of the given route attribute.

In one embodiment of the disclosure, the route attribute(s) (206A-206N) specified in the namespace attribute list (204) may conform to network route pertinent information described, or otherwise offered, by a given routing protocol—e.g., the routing protocol through which the network device (see e.g., FIG. 1) received the given network route. For example, with respect to BGP, examples of the route attribute(s) (206A-206N) (also referred to as BGP metrics or BGP path attributes) may include, but are not limited to, an ORIGIN attribute, an AS_PATH attribute, a NEXT_HOP attribute, a MULTI_EXIT_DISC (or MED) attribute, a LOCAL_PREF attribute, an ATOMIC_AGGREGATE attribute, an AGGREGATOR attribute, a COMMUNITY attribute, etc. The aforementioned route attribute examples are well-known in the art and will not be described in further detail in the disclosure. Further, one of ordinary skill will appreciate that the route attribute(s) (206A-206N) specified in the namespace attribute list (204) is/are not limited to the aforementioned examples.

In one embodiment of the disclosure, any state namespace (200) may be created and function as a mutable state namespace. In a mutable state namespace, the specified route attribute(s) (206A-206N) (or more specifically, the route attribute value(s) thereof) is/are editable (i.e., readable and writeable). Further, a mutable state namespace may lack or exclude an associated namespace ID (202). Accordingly, for a mutable state namespace, only a route attribute name of a given route attribute (206A-206N) may be necessary to lookup or assign a route attribute value of/to the given route attribute (206A-206N)—e.g., "MED" for route attribute lookup, or "MED=1" for route attribute assignment. An example of a mutable state namespace, which is disclosed in the disclosure, is the current state namespace (described below) (see e.g., FIG. 3). In another embodiment of the disclosure, the current state namespace, though configured to be mutable, may be associated with an appropriate current namespace ID.

In one embodiment of the disclosure, any state namespace (200) may be created and function as an immutable state namespace. In an immutable state namespace, the specified route attribute(s) (206A-206N) (or more specifically, the route attribute value(s) thereof) is/are readable only. Further, an immutable state namespace may include an associated namespace ID (202). Accordingly, for an immutable state namespace, a character string concatenating the namespace ID (202), an attribute access operator (e.g., a dot character), and a route attribute name of a given route attribute (206A-206N) may be necessary to lookup or assign a route attribute value of/to the given route attribute (206A-206N)—e.g., "ID.MED" for route attribute lookup, or "ID.MED=1" for route attribute assignment. An example of an immutable state namespace, which is disclosed in the disclosure, is the initial state namespace (described below) (see e.g., FIG. 3). As mentioned above, in another embodiment of the disclosure, the current state namespace, though configured to be mutable, may be associated with an appropriate current namespace ID and, accordingly, in such an embodiment and similar to any immutable state namespace, may require the aforementioned character string concatenation of the current namespace ID, the attribute access operator, and a route attribute name for route attribute lookup and/or assignment operations.

While FIG. 2 shows a configuration of information, other state namespace (200) configurations may be used without departing from the scope of the disclosure.

Figure 3:
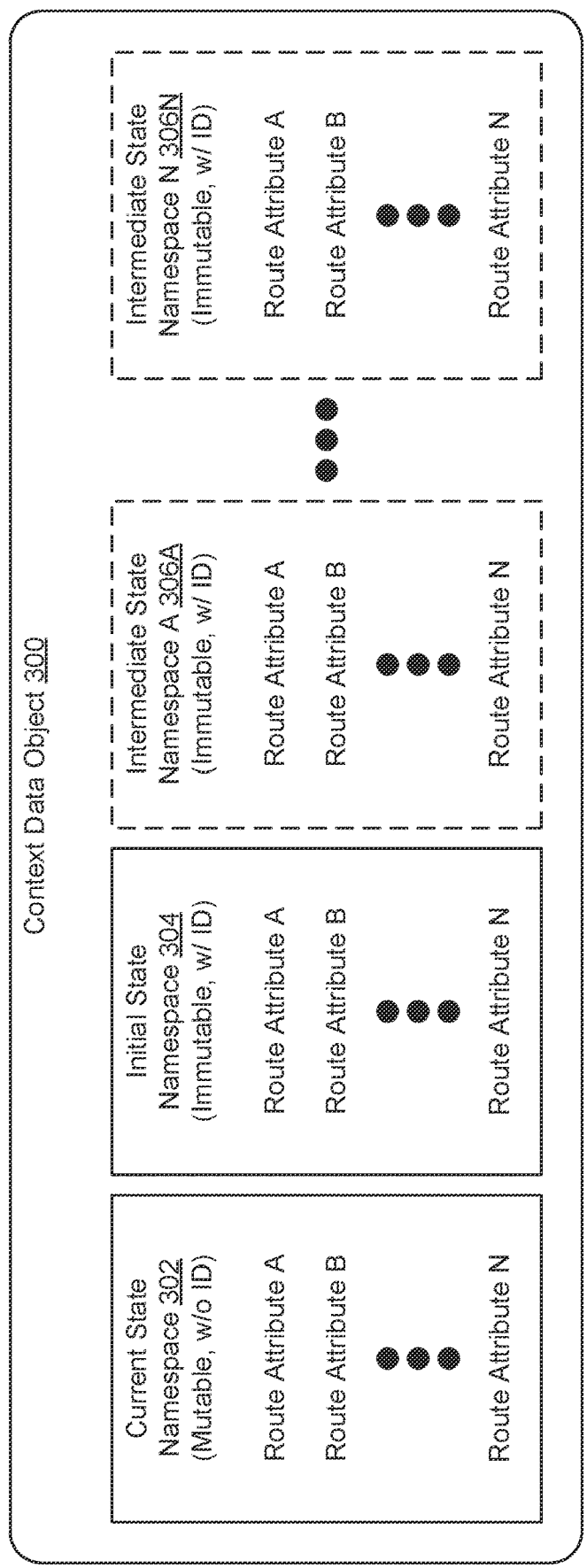
FIG. 3 shows a context data object in accordance with one or more embodiments of the disclosure.

FIG. 3 shows a context data object in accordance with one or more embodiments of the disclosure. A context data object (CDO) (300) may refer to a data container (i.e., maintained within volatile storage or memory of the network device), which may pertain to a given network route, and may be created to hold a collection of state namespaces (described above) (see e.g., FIG. 2). Particularly, any given CDO (300) may include a current state namespace (302), an initial state namespace (304), and zero or more intermediate state namespaces (306A-306N). Each of these pieces of information is described below.

In one embodiment of the disclosure, the current state namespace (302) may represent a state namespace that maintains a current route attribute value for each of the one or more route attribute(s) specified therein. A current route attribute value may reflect a present or latest snapshot (or state) of a route attribute that exists at a present point-in-time. Further, by default, the current state namespace (302) may be configured as a mutable state namespace (described above); however, based on the circumstance or at the request of a network device (or network) administrator, the current state namespace (302) may alternatively be configured as an immutable state namespace (also described above).

In one embodiment of the disclosure, the initial state namespace (304) may represent a state namespace that maintains an initial route attribute value for each of the one or more route attribute(s) specified therein. An initial route attribute value may reflect a first or starting snapshot (or state) of a route attribute that exists/existed at a generation point-in-time associated with the initialization of the CDO (300). Further, by default, the initial state namespace (304) may be configured as an immutable state namespace (described above); however, based on the circumstance or at the request of a network device (or network) administrator, the initial state namespace (304) may alternatively be configured as a mutable state namespace (also described above).

In one embodiment of the disclosure, an intermediate state namespace (306A-306N) (if any) may represent a state namespace that maintains an intermediate route attribute value for each of the one or more route attribute(s) specified therein. An intermediate route attribute value may reflect a snapshot (or state) of a route attribute that is neither the first/starting nor the present/latest snapshot (or state), but rather a snapshot (or state) of the route attribute therebetween. Accordingly, an intermediate route attribute value may reflect a snapshot (or state) of a route attribute that exists/existed at a point-in-time following the above-mentioned generation point-in-time and the above-mentioned present point-in-time. Further, by default, an intermediate state namespace (306A-306N) (if any) may be configured as an immutable state namespace (described above); however, based on the circumstance or at the request of a network device (or network) administrator, an intermediate state namespace (306A-306N) may alternatively be configured as a mutable state namespace (also described above).

While FIG. 3 shows a configuration of information, other context data object (300) configurations may be used without departing from the scope of the disclosure.

Figure 4:
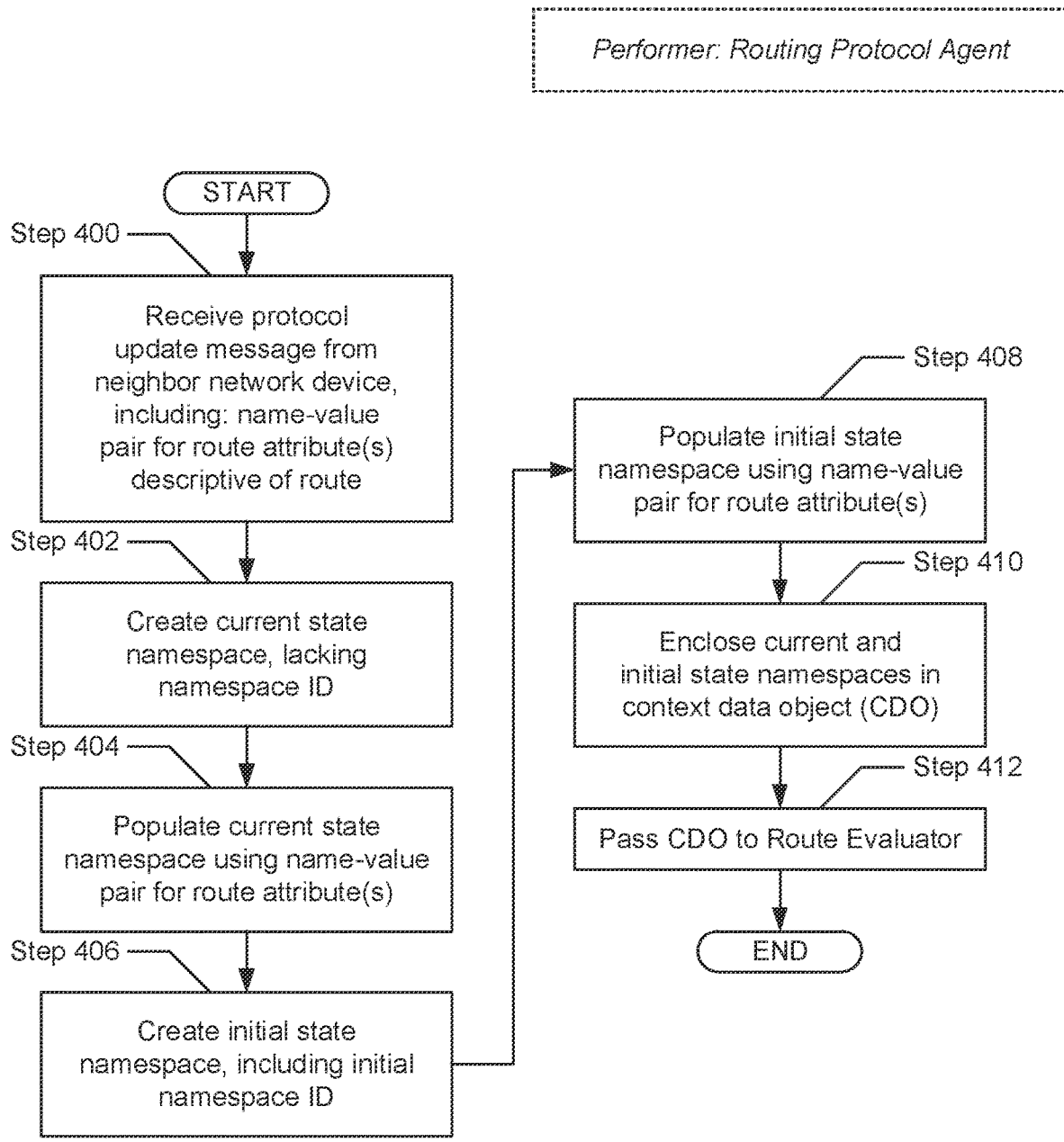
FIG. 4 shows a flowchart describing a method for context data object generation in accordance with one or more embodiments of the disclosure.

FIG. 4 shows a flowchart describing a method for context data object generation in accordance with one or more embodiments of the disclosure. The various steps outlined below may be performed by any routing protocol agent (see e.g., FIG. 1). Further, while the various steps in the flowchart are presented and described sequentially, one of ordinary skill will appreciate that some or all steps may be executed in different orders, may be combined or omitted, and some or all steps may be executed in parallel.

Turning to FIG. 4, in Step 400, a protocol update message is received from a neighbor network device. In one embodiment of the disclosure, the protocol update message may represent a network route advertisement, or one or more network traffic data units (e.g., frame(s), packet(s), etc.) used by peers of a given routing protocol to distribute routing information pertinent to a network route. Further, the protocol update message may include one or more name-value pairs, definitive of one or more route attributes, respectively, for a given network route.

In Step 402, a current state namespace is created. In one embodiment of the disclosure, the current state namespace may be configured such that it is reflective of a mutable state namespace and, thus, lacks or excludes an associated namespace ID. In another embodiment of the disclosure, the current state namespace, though reflective of a mutable state namespace, may alternatively include an appropriate current namespace ID. Thereafter, in Step 404, the current state namespace (created in Step 402) is populated using the name-value pair(s) for the route attribute(s) specified in the protocol update message (received in Step 400).

In Step 406, an initial state namespace is created. In one embodiment of the disclosure, the initial state namespace may be configured such that it is reflective of an immutable state namespace and, thus, includes an associated initial namespace ID. Thereafter, in Step 408, the initial state namespace (created in Step 406) is populated using the name-value pair(s) for the route attribute(s) specified in the protocol update message (received in Step 400).

In Step 410, the current and initial state namespaces (populated in Steps 404 and 408, respectively) are enclosed within a context data object (CDO), which may be associated with the given network route. Thereafter, in Step 412, the CDO (obtained in Step 410) is passed or provided to the route evaluator (see e.g., FIG. 1).

Figure 5A:
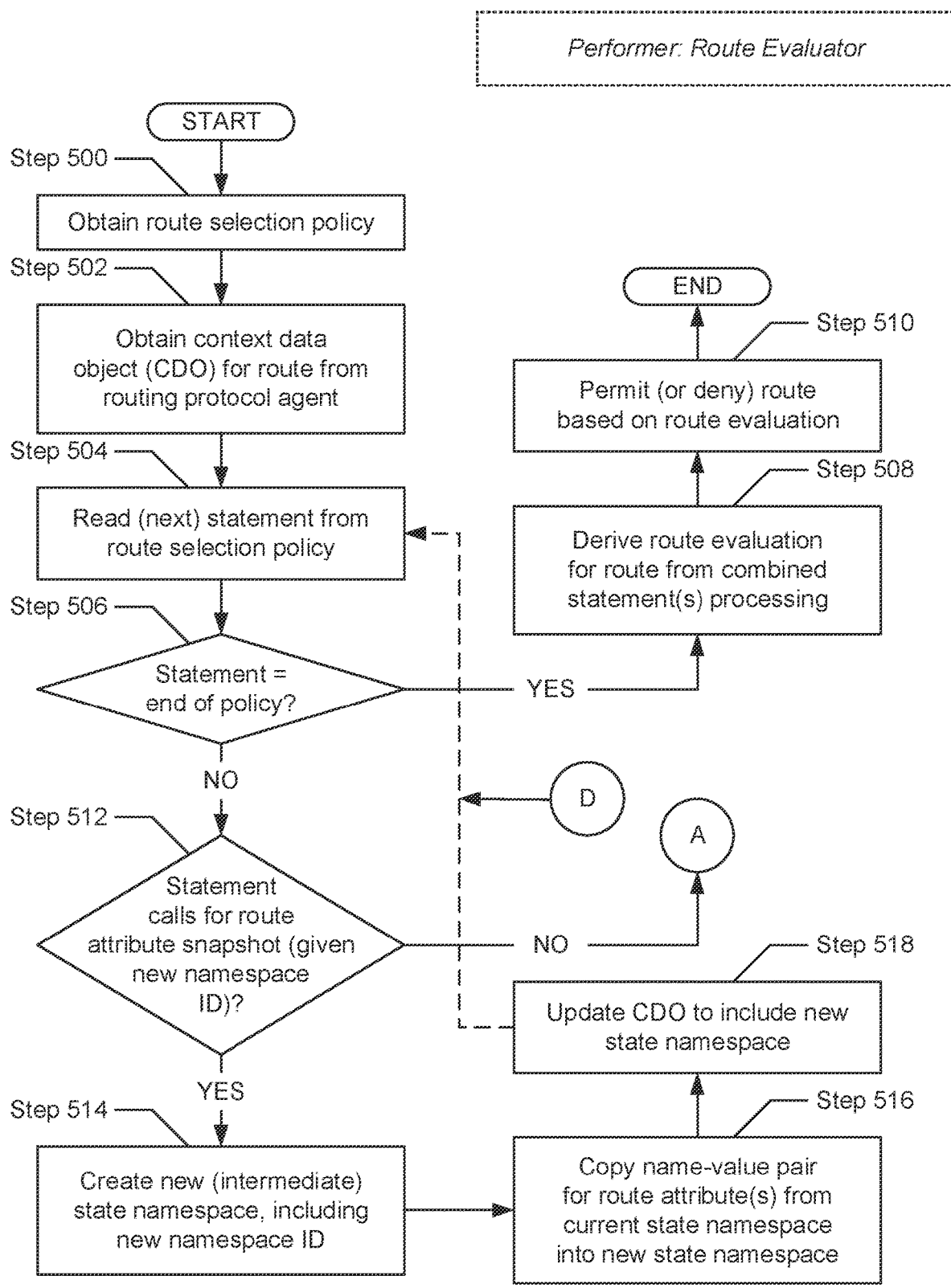
FIGS. 5A-5C show flowcharts describing a method for route evaluation in accordance with one or more embodiments of the disclosure.
Figure 5B:
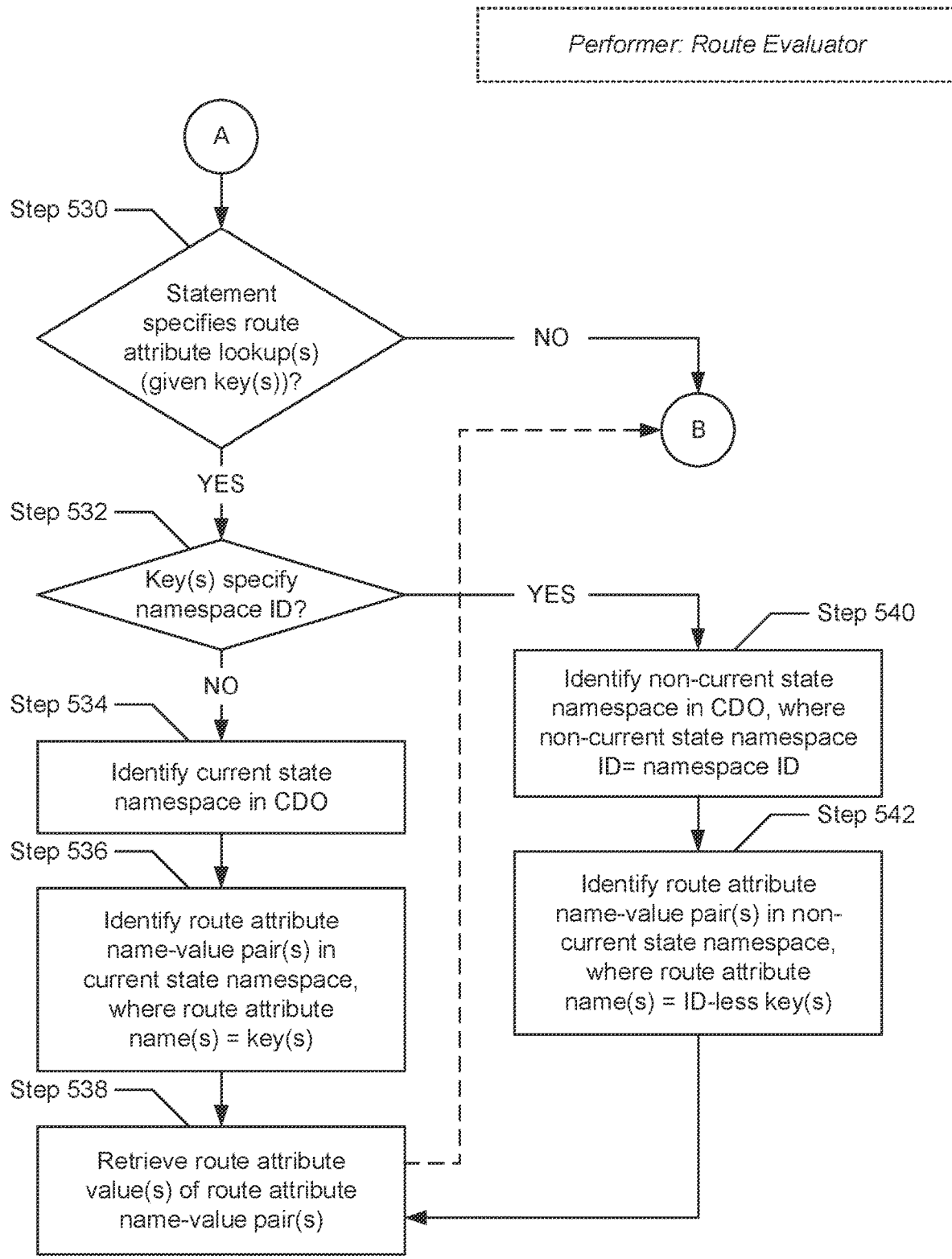
Figure 5C:
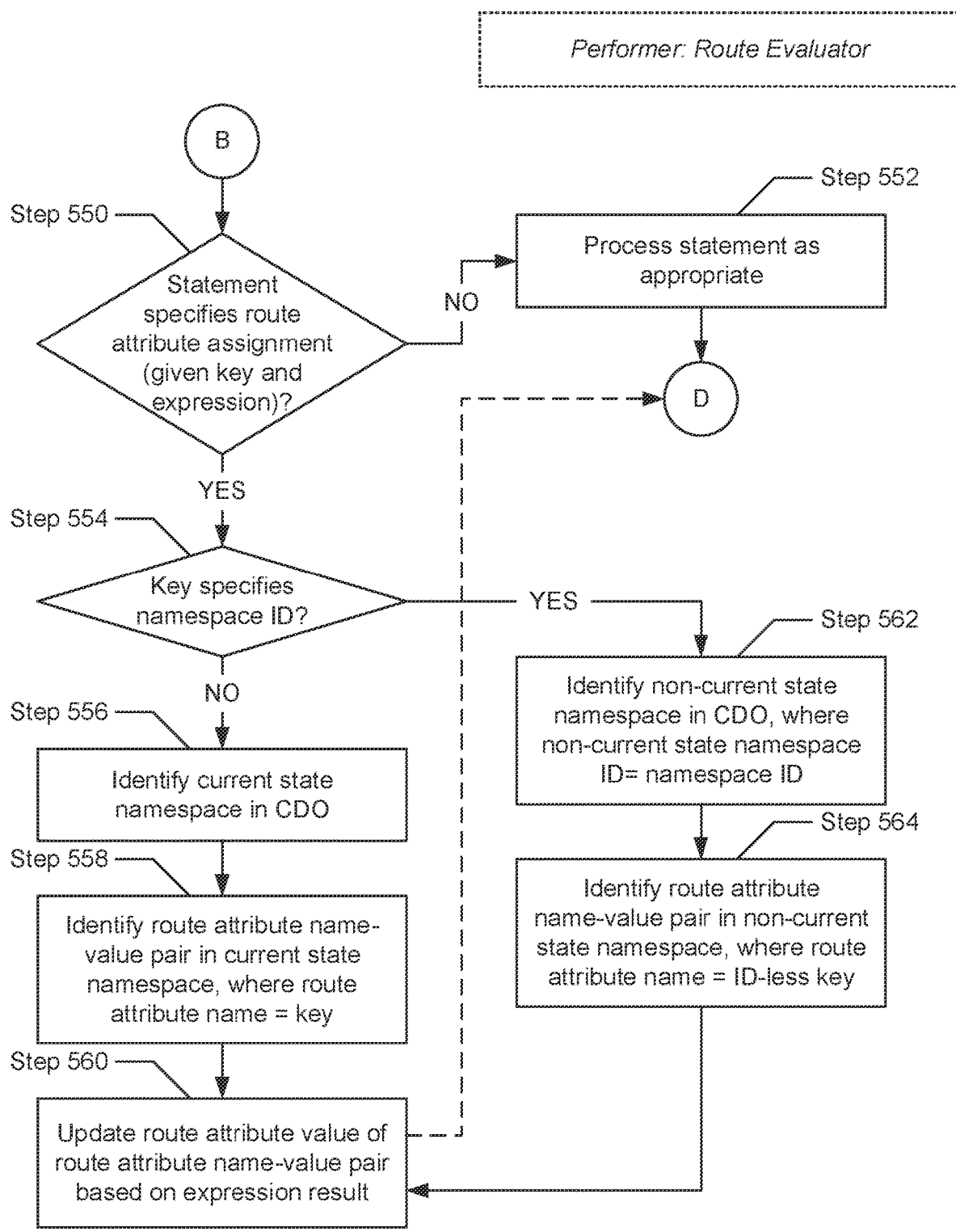
Figure 6A:
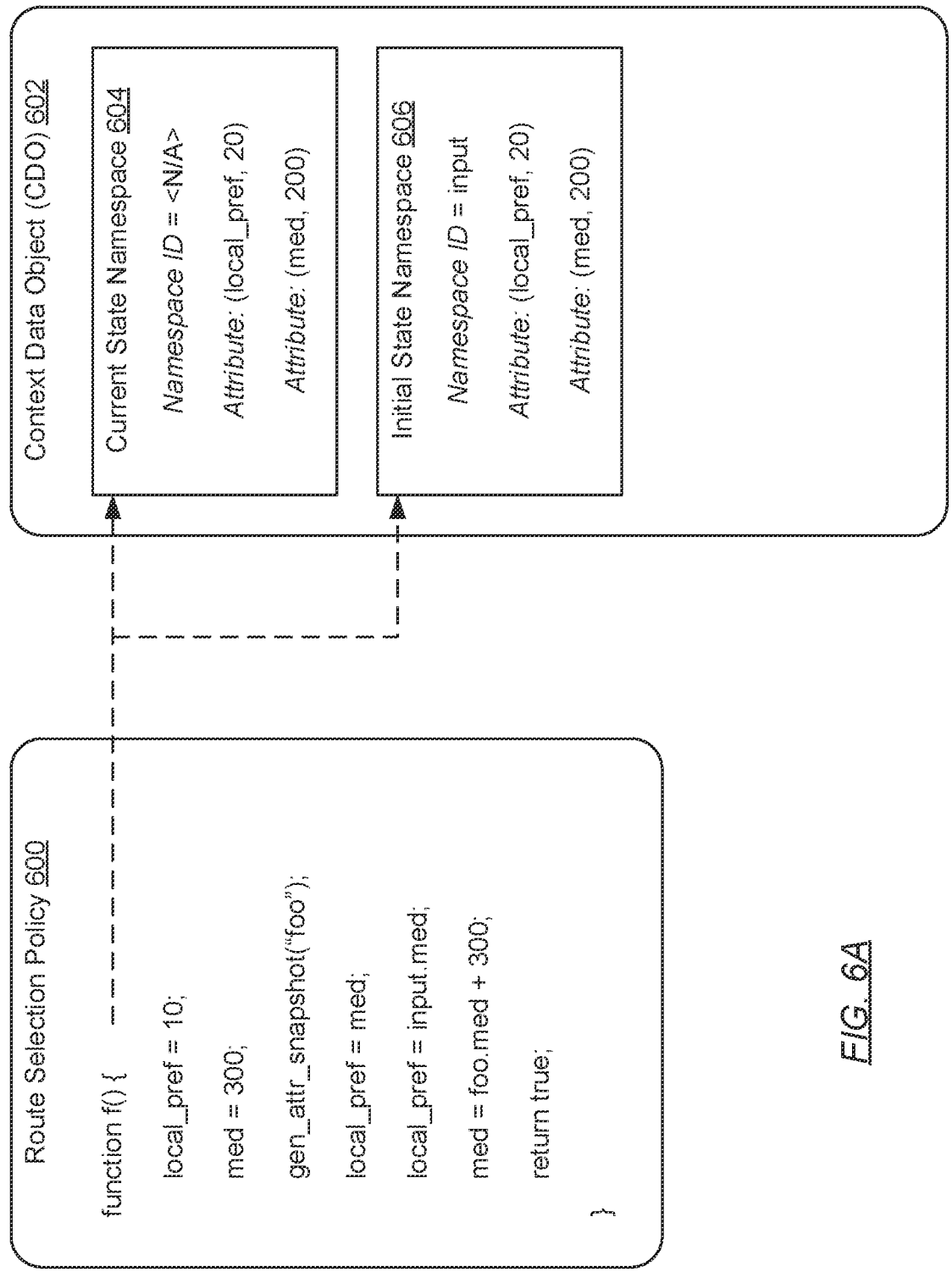
Figure 6B:
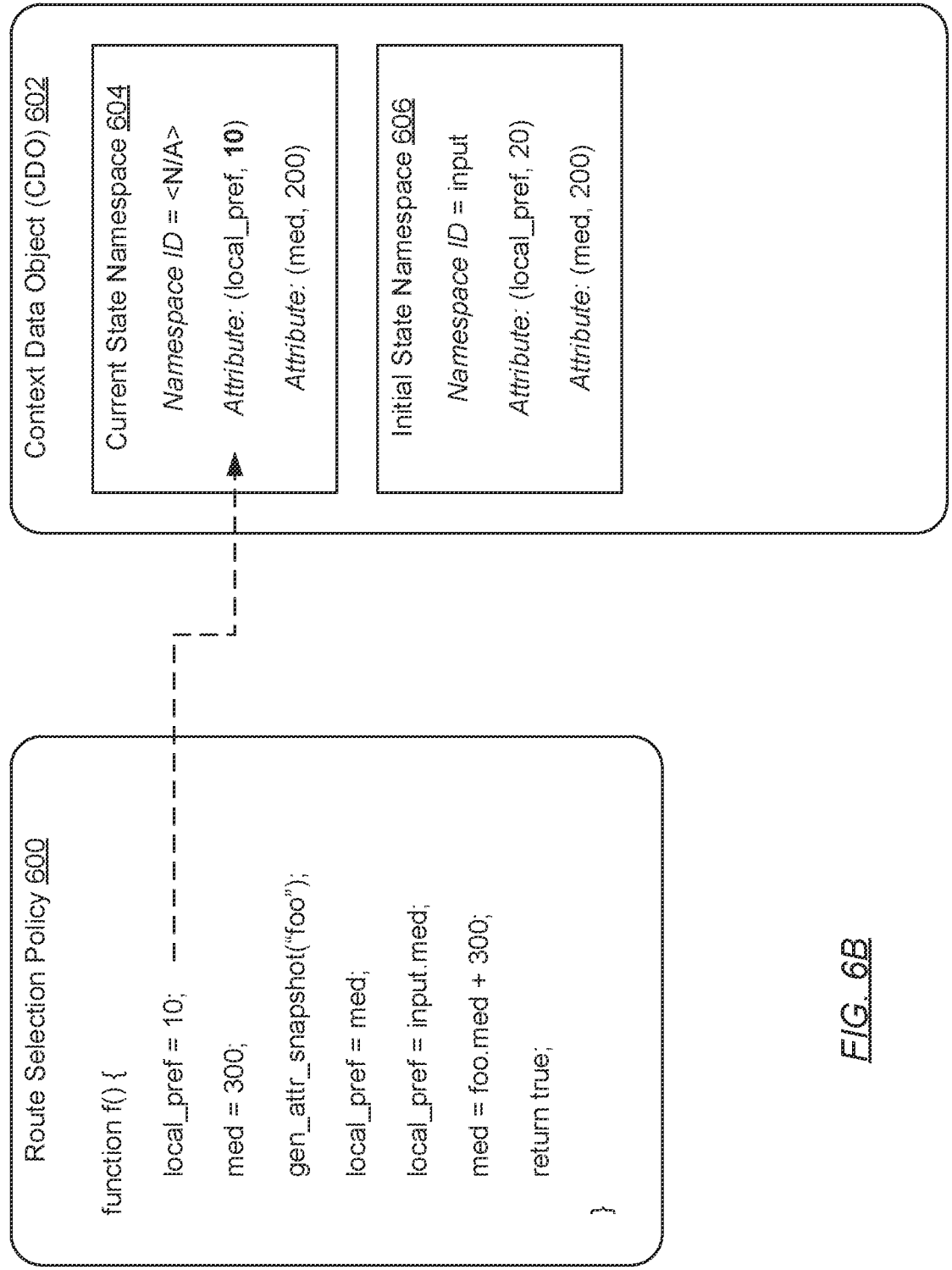
Figure 6C:
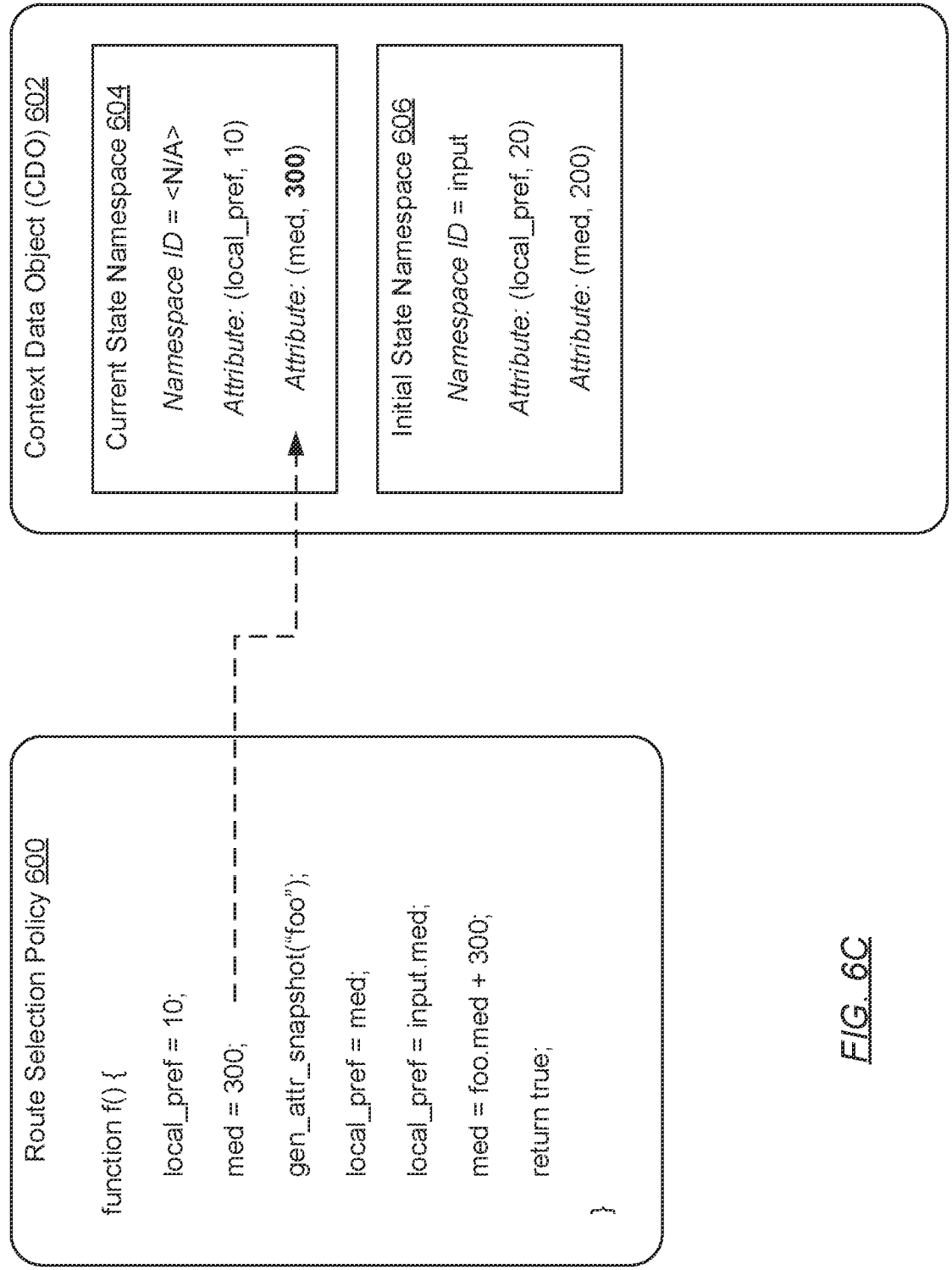
Figure 6D:
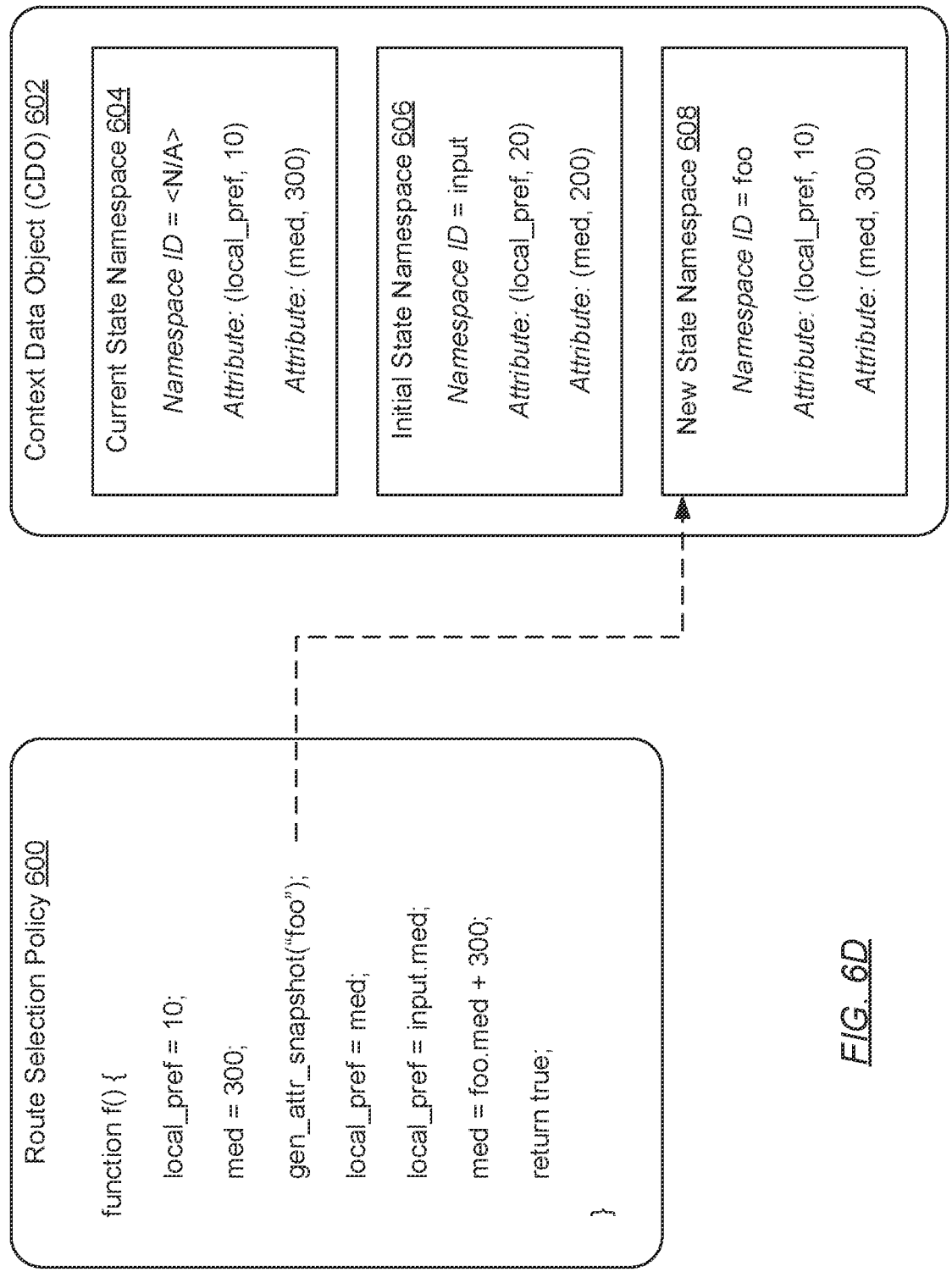
Figure 6E:
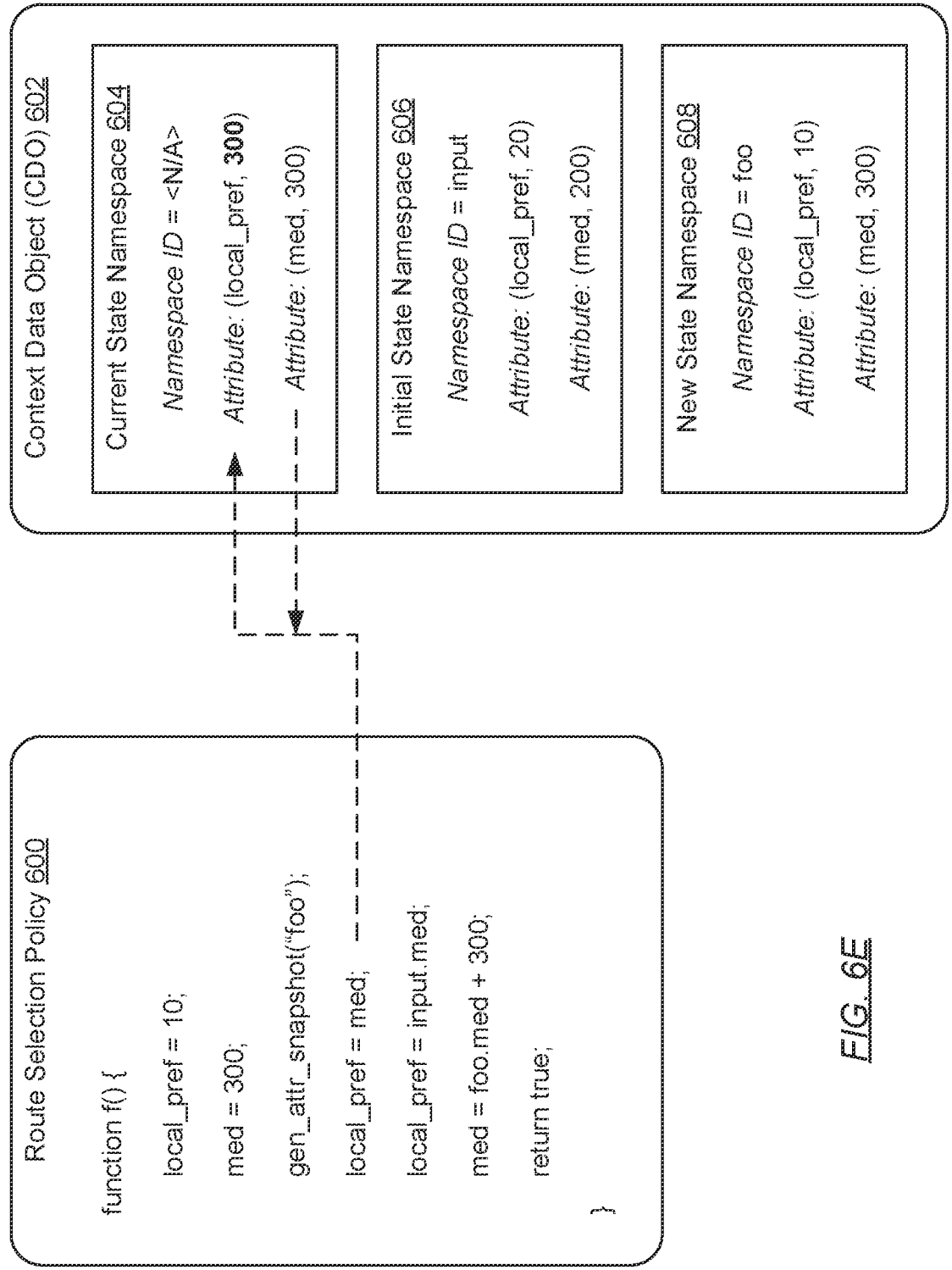
Figure 6E:
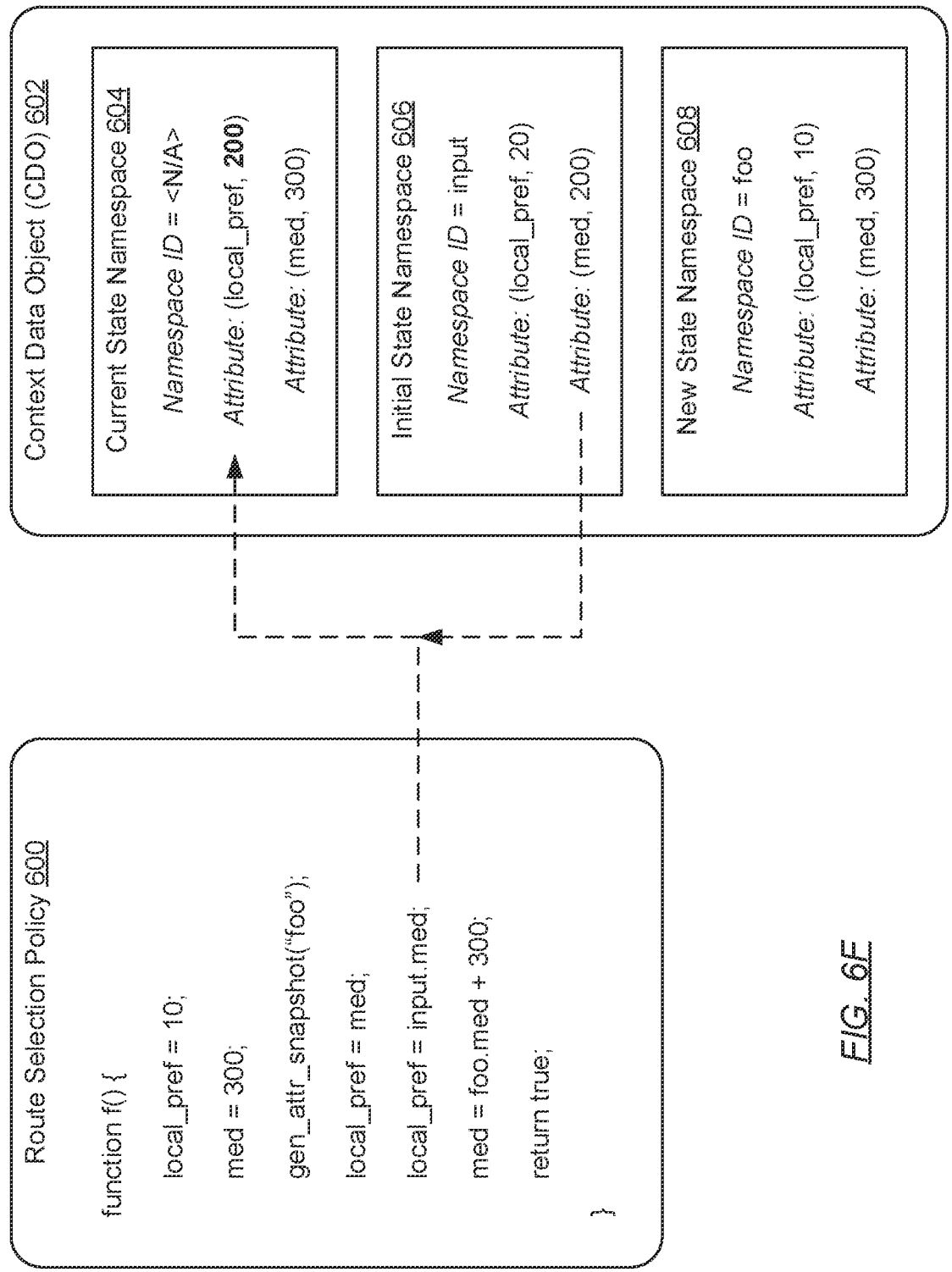
Figure 6G:
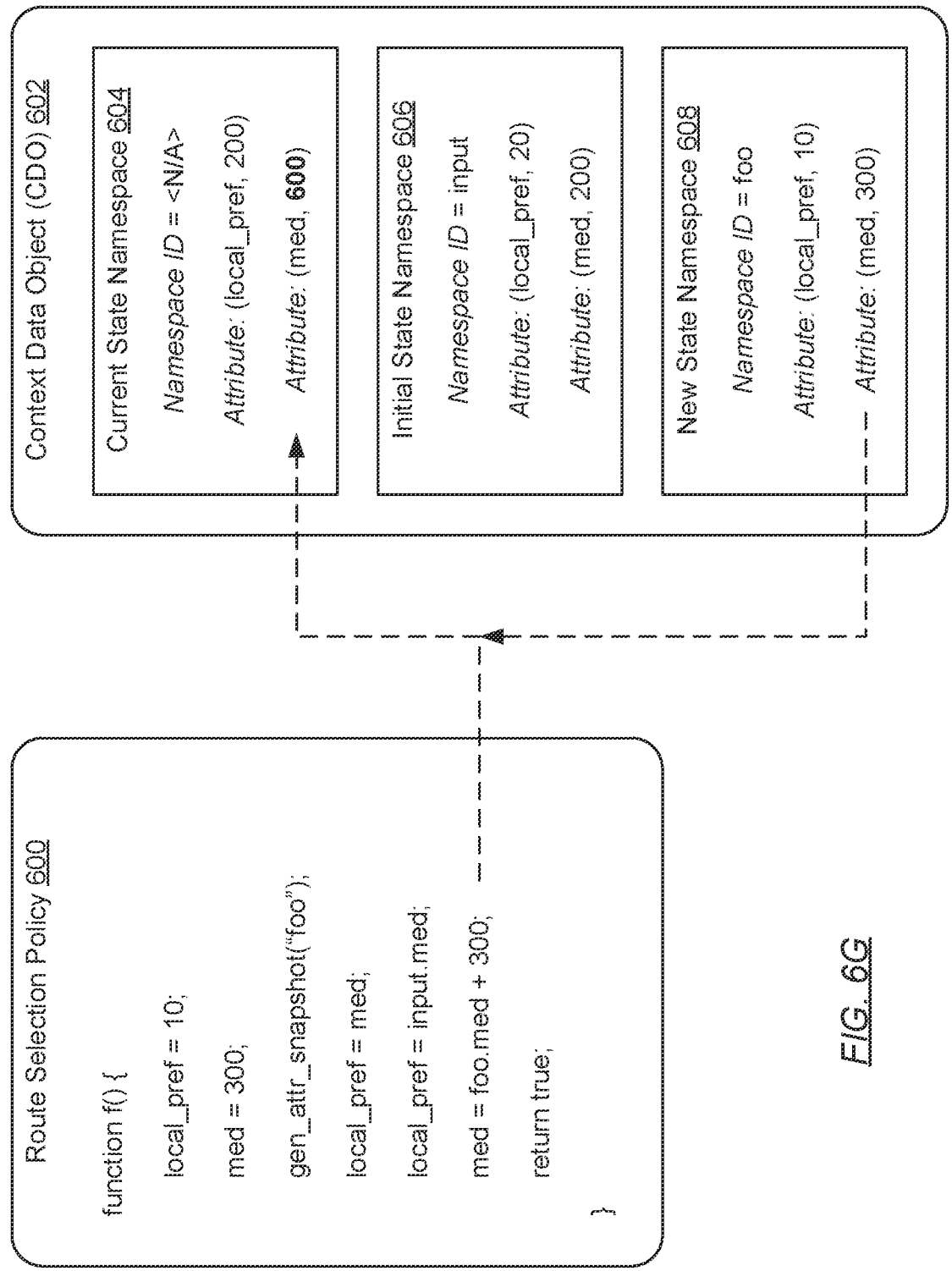
Figure 6H:
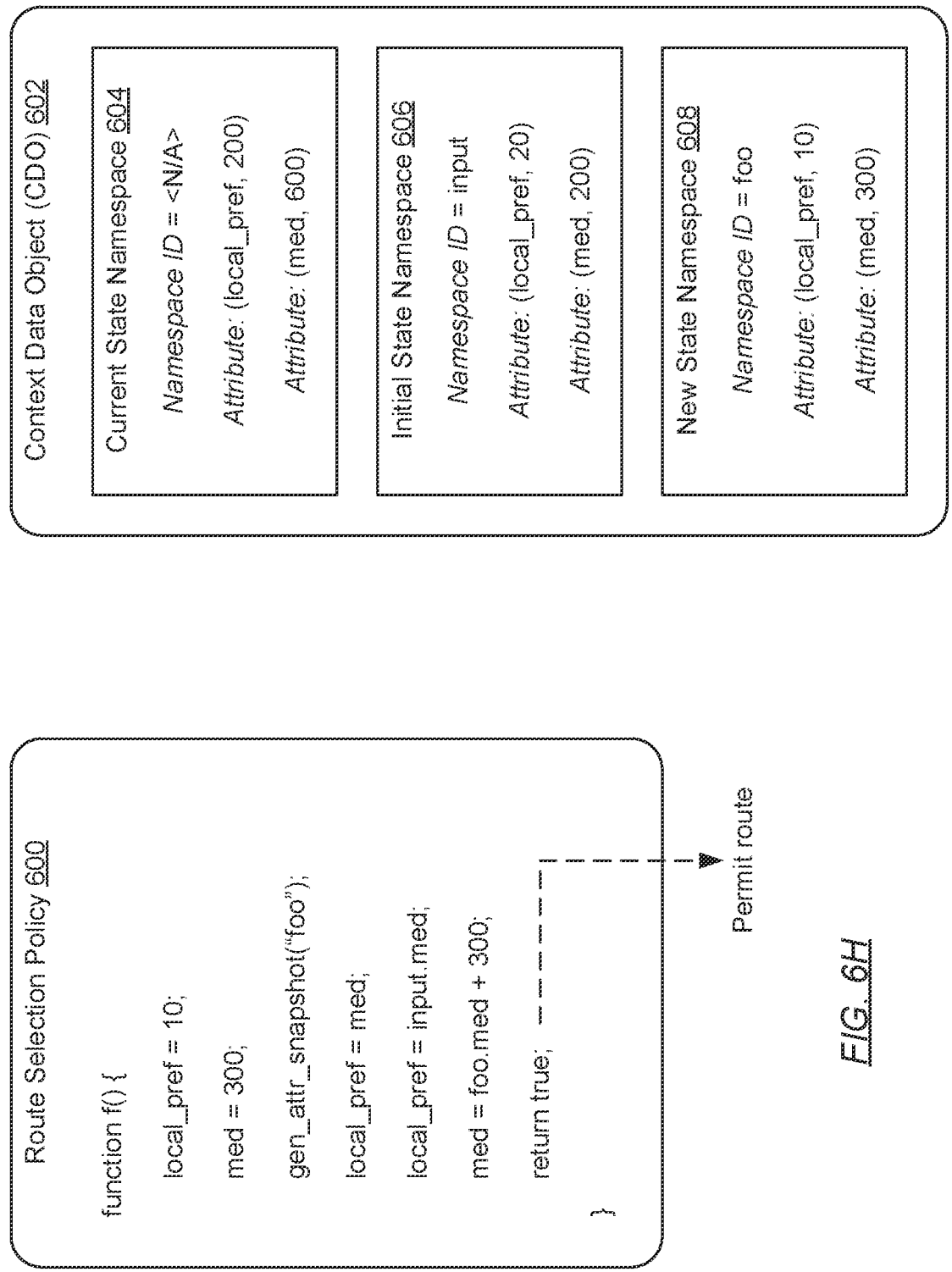

FIGS. 5A-5C show flowcharts describing a method for route evaluation in accordance with one or more embodiments of the disclosure. The various steps outlined below may be performed by the route evaluator (see e.g., FIG. 1). Further, while the various steps in the flowchart are presented and described sequentially, one of ordinary skill will appreciate that some or all steps may be executed in different orders, may be combined or omitted, and some or all steps may be executed in parallel.

Turning to FIG. 5A, in Step 500, a route selection policy is obtained. In one embodiment of the disclosure, the route selection policy may generally represent any scheme through which a network route may be assessed, and/or an action concerning the network route may be taken. By way of a more specific example, the route selection policy may represent any scheme through which a network route may be selected for installation into a RIB of the network device. Further, the route selection policy may be retrieved from a route selection policy database (DB) of the network device. In addition, the route selection policy may include a sequence of statements, which when read/executed by the route evaluator, applies the route selection policy to a network route being evaluated.

In Step 502, a network route is obtained, or more specifically, a context data object (CDO) thereof is obtained from a routing protocol agent (see e.g., FIG. 1). In one embodiment of the disclosure, the CDO may include a current state namespace that reflects a current route attribute value for each of a set of route attributes descriptive of the network route, and an initial state namespace that reflects an initial route attribute value for each of the aforementioned set of route attributes. At this point-in-time, the current route attribute value for any given route attribute matches the initial route attribute value thereof.

In Step 504, a statement in the sequence of statements from the route selection policy (obtained in Step 500) is read. In Step 506, based on an examination of the statement (read in Step 500), a determination is made as to whether the statement is indicative of the end of the route selection policy. The end of the route selection policy may, for example, be referenced through a special or reserved character string (e.g., including letters, numbers, symbols, or any combination thereof). Accordingly, in one embodiment of the disclosure, if it is determined that the statement is indeed indicative of the end of the route selection policy, then the process proceeds to Step 508. On the other hand, in another embodiment of the disclosure, if it is alternatively determined that the statement is not indicative of the end of the route selection policy, then the process alternatively proceeds to Step 512.

In Step 508, following the determination (in Step 506) that the statement (read in Step 504) indicates the end of the route selection policy (obtained in Step 500), a route evaluation for the given network route, associated with the CDO (obtained in Step 502), is derived. In one embodiment of the disclosure, derivation of the route evaluation may entail processing of the sequence of statements representative of the route selection policy, in conjunction to actions applied to the CDO (described below). Thereafter, in Step 510, based on the route evaluation (derived in Step 508), a route action is performed or taken on the given network route. Specifically, in one embodiment of the disclosure, the route action may either permit or deny installation of the given network route into the RIB of the network device.

In Step 512, following the alternative determination (in Step 506) that the statement (read in Step 504) does not indicate the end of the route selection policy (obtained in Step 500), another determination is made as to whether the statement calls for or invokes a route attribute snapshot. A route attribute snapshot call or invocation may trigger a sub-method (or sub-process) directed to recording or cloning, for potential future reference, the set of current route attribute values for the set of route attributes, respectively, maintained in the current state namespace. Further, to call for or invoke a route attribute snapshot, the statement may include a function (or sub-routine) call that accepts a new namespace ID as an argument or a passed variable—e.g., "gen_attr_snapshot(new_namespace_ID)". Accordingly, in one embodiment of the disclosure, if it is determined that the statement calls for or invokes a route attribute snapshot, then the process proceeds to Step 514. On the other hand, in another embodiment of the disclosure, if it is alternatively determined that the statement does not call for or does not invoke a route attribute snapshot, then the process alternatively proceeds to Step 530 (see e.g., FIG. 5B).

In Step 514, following the determination (in Step 512) that the statement (read in Step 504) calls for or invokes a route attribute snapshot, a new state namespace is created. In one embodiment of the disclosure, the new state namespace may exemplify an intermediate state namespace (described above) (see e.g., FIG. 3), and may include (or may be initialized using) the above-mentioned new namespace ID.

In Step 516, a set of name-value pairs, representative of a set of route attributes, respectively, descriptive of the network route, is copied from the current state namespace stored in the CDO (obtained in Step 502) into the new state namespace (created in Step 514).

In Step 518, the CDO (obtained in Step 502) is subsequently updated to include the new state namespace (populated with the set of name-value pairs in Step 516). Following the update of the CDO, the process proceeds to Step 504, where another (or next) statement (if any) may be read from the sequence of statements representative of the route selection policy (obtained in Step 500).

Turning to FIG. 5B, in Step 530, following the alternative determination (in Step 512) (see e.g., FIG. 5A) that the statement (read in Step 504) does not call for, or does not invoke, a route attribute snapshot, another determination is made as to whether the statement specifies at least one route attribute lookup. A/each route attribute lookup may entail the retrieval of a route attribute value of a name-value pair for a given route attribute, which may be specified or listed within a given state namespace included in the CDO (obtained in Step 502 or updated in Step 518). Further, a/each route attribute lookup may be associated with a key, which may represent any arbitrary-length character string (e.g., including letters, numbers, symbols, spaces, etc.) that specifies a route attribute name of a name-value pair for a given route attribute (e.g., "MED"); or a concatenation of a namespace ID, an attribute access operator (e.g., a dot character), and the aforementioned route attribute name (e.g., "ID.MED"). Accordingly, in one embodiment of the disclosure, if it is determined that the statement specifies at least one route attribute lookup, then the process proceeds to Step 532. On the other hand, in another embodiment of the disclosure, if it is alternatively determined that the statement does not specify any route attribute lookups, then the process alternatively proceeds to Step 550 (see e.g., FIG. 5C).

In Step 532, following the determination (in Step 530) that the statement (read in Step 504) specifies at least one route attribute lookup, for each specified route attribute lookup, another determination is made as to whether the key, associated with the specified route attribute lookup, specifies a namespace ID. Accordingly, in one embodiment of the disclosure, if it is determined that the key, associated with a given route attribute lookup, does not specify a namespace ID, then the process proceeds to Step 534. On the other hand, in another embodiment of the disclosure, if it is alternatively determined that the key, associated with a given route attribute lookup, does specify a namespace ID, then the process alternatively proceeds to Step 540.

In Step 534, following the determination (in Step 532) that a key (described above), associated with a given route attribute lookup, does not specify a namespace ID, the current state namespace, which lacks a namespace ID, is identified from the CDO (obtained in Step 502 or updated in Step 518). In another embodiment of the invention, the current state namespace may be associated with an appropriate current namespace ID and, accordingly, in identifying the current state namespace, the key would need to specify the aforementioned appropriate current namespace ID.

In Step 536, for a given route attribute lookup, a name-value pair for a given route attribute is identified from the current state namespace (identified in Step 534). In one embodiment of the disclosure, the identified name-value pair for the given route attribute may include a route attribute name that matches the key associated with the given route attribute lookup.

In Step 538, for a given route attribute lookup, a route attribute value of the name-value pair for the given route attribute (identified in Step 536) is retrieved. Following the retrieval of a route attribute value for each route attribute lookup in the at least one route attribute lookup specified in the statement, the process proceeds to Step 550 (see e.g., FIG. 5C).

In Step 540, following the alternative determination (in Step 532) that a key (described above), associated with a given route attribute lookup, specifies a namespace ID, a non-current state namespace is identified from the CDO (obtained in Step 502 or updated in Step 518). In one embodiment of the disclosure, the non-current state namespace may reference the initial state namespace or an intermediate state namespace (if any) enclosed in the CDO. Further, the specified name space ID may match a non-current state namespace ID included in the non-current state namespace.

In Step 542, for a given route attribute lookup, a name-value pair for a given route attribute is identified from the non-current state namespace (identified in Step 540). In one embodiment of the disclosure, the identified name-value pair for the given route attribute may include a route attribute name that matches an ID-less portion of the key associated with the given route attribute lookup. The ID-less portion of any given key may reflect the given key without the namespace ID and the attribute access operator specified therein. In other words, the ID-less portion of any given key may include just the route attribute name specified therein (e.g., if key specifies "ID.MED", then ID-less portion of key specifies "MED"). Following the identification of the name-value pair for a given route attribute for each route attribute lookup in the at least one route attribute lookup specified in the statement, the process proceeds to Step 538, where a route attribute value of the name-value pair for the given route attribute (identified in Step 542) may be retrieved.

Turning to FIG. 5C, in Step 550, following the alternative determination (in Step 530) that the statement (read in Step 504) does not specify any route attribute lookups, or following the retrieval of at least one route attribute value (in Step 538), another determination is made as to whether the statement specifies a route attribute assignment (described below). Accordingly, in one embodiment of the disclosure, if it is determined that the statement does not specify a route attribute assignment, then the process proceeds to Step 552. On the other hand, in another embodiment of the disclosure, if it is alternatively determined that the statement does specify a route attribute assignment, then the process alternatively proceeds to Step 554.

In one embodiment of the disclosure, the above-mentioned route attribute assignment may entail the setting or updating of a route attribute value of a name-value pair for a given route attribute, which may be specified or listed within a given state namespace included in the CDO (obtained in Step 502 or updated in Step 518). Further, the route attribute assignment may be associated with a key and an expression, and may specify an assignment operator (e.g., "=") there-between (e.g., "key=expression"). The key may represent any arbitrary-length character string (e.g., including letters, numbers, symbols, spaces, etc.) that specifies a route attribute name of a name-value pair for a given route attribute (e.g., "MED"); or a concatenation of a namespace ID, an attribute access operator (e.g., a dot character), and the aforementioned route attribute name (e.g., "ID.MED").

Meanwhile, the above-mentioned expression may represent any arbitrary-length character string (e.g., including letters, numbers, symbols, spaces, etc.) that, for example, specifies or reflects one of the following: the at least one route attribute lookup (determined in Step 530 to also be specified in the statement); a quantitative (e.g., "10") or qualitative (e.g., "FALSE") state appropriate to (or compatible with) the given route attribute; or a mathematical expression entailing one or more mathematical operations (e.g., addition, subtraction, multiplication, division, etc.), denoted by the presence of one or more mathematical operators (e.g., a plus operator, a minus operator, a times operator, an obelus operator, etc.), between any combination of the at least one route attribute lookup and/or at least one quantitative or qualitative state appropriate to (or compatible with) the given route attribute—e.g., "MED=ID.MED+20". The expression is not limited to the aforementioned examples.

In Step 552, following the determination (in Step 550) that the statement (read in Step 504) does not specify a route attribute assignment, the statement is processed as appropriate. That is, in one embodiment of the disclosure, should the statement specify or reflect any other instruction (i.e., other than a route attribute snapshot call/invocation, a route attribute lookup, or a route attribute assignment), the statement may be executed accordingly. Following the processing of the statement as appropriate, the process proceeds to Step 504 (see e.g., FIG. 5A), where another (or next) statement (if any) may be read from the sequence of statements representative of the route selection policy (obtained in Step 500).

In Step 554, following the alternative determination (in Step 550) that the statement (read in Step 504) specifies a route attribute assignment, another determination is made as to whether the key, associated with the specified route attribute assignment, specifies a namespace ID. Accordingly, in one embodiment of the disclosure, if it is determined that the key, associated with the route attribute assignment, does not specify a namespace ID, then the process proceeds to Step 556. On the other hand, in another embodiment of the disclosure, if it is alternatively determined that the key, associated with the route attribute assignment, does specify a namespace ID, then the process alternatively proceeds to Step 562.

In Step 556, following the determination (in Step 554) that a key (described above), associated with the route attribute assignment, does not specify a namespace ID, the current state namespace, which lacks a namespace ID, is identified from the CDO (obtained in Step 502 or updated in Step 518). In another embodiment of the disclosure, the current state namespace may be associated with an appropriate current namespace ID and, accordingly, in identifying the current state namespace, the key would need to specify the aforementioned appropriate current namespace ID.

In Step 558, a name-value pair for a given route attribute is identified from the current state namespace (identified in Step 556). In one embodiment of the disclosure, the identified name-value pair for the given route attribute may include a route attribute name that matches the key associated with the route attribute assignment.

In Step 560, a route attribute value of the name-value pair for the given route attribute (identified in Step 558) is updated. Specifically, in one embodiment of the disclosure, the route attribute value may be updated based on an expression result of the expression associated with the route attribute assignment. By way of an example, if the expression entails a route attribute lookup concerning the retrieval of a route attribute value for another given route attribute listed in the current state namespace or another given state namespace, the expression result of the expression may reflect the aforementioned route attribute value for the other given route attribute. By way of another example, if the expression entails a quantitative or qualitative state appropriate to (or compatible with) the given route attribute, then the expression result of the expression may reflect the aforementioned quantitative or qualitative state. By way of yet another example, if the expression entails an operation (e.g., a mathematical operation, a comparative operation, etc.) involving at least two route attribute lookups, or at least one route attribute lookup and at least one quantitative (or qualitative) state, then the expression result may reflect the result of the aforementioned operation (e.g., the result of a mathematical operation, the result of a comparative operation, etc.). Following the update of the route attribute value, the process proceeds to Step 504 (see e.g., FIG. 5A), where another (or next) statement (if any) may be read from the sequence of statements representative of the route selection policy (obtained in Step 500).

In Step 562, following the alternative determination (in Step 554) that a key (described above), associated with the route attribute assignment, specifies a namespace ID, a non-current state namespace is identified from the CDO (obtained in Step 502 or updated in Step 518). In one embodiment of the disclosure, the non-current state namespace may reference the initial state namespace or an intermediate state namespace (if any) enclosed in the CDO. Further, the specified namespace ID may match a non-current state namespace ID included in the non-current state namespace.

In Step 564, a name-value pair for a given route attribute is identified from the non-current state namespace (identified in Step 562). In one embodiment of the disclosure, the identified name-value pair for the given route attribute may include a route attribute name that matches an ID-less portion of the key associated with the route attribute assignment. The ID-less portion of any given key may reflect the given key without the namespace ID and the attribute access operator specified therein. In other words, the ID-less portion of any given key may include just the route attribute name specified therein (e.g., if key specifies "ID.MED", then ID-less portion of key specifies "MED"). Following the identification of the name-value pair for a given route attribute for the route attribute assignment, the process proceeds to Step 560, where a route attribute value of the name-value pair for the given route attribute (identified in Step 564) may be updated based on an expression result of the expression associated with the route attribute assignment.

FIGS. 6A-6H show an exemplary scenario in accordance with one or more embodiments of the disclosure. The exemplary scenario, illustrated through FIGS. 6A-6H and described below, is for explanatory purposes only and not intended to limit the scope of the disclosure.

For the exemplary scenario, consider a route evaluator (see e.g., FIG. 1) on a network device, which has been given a context data object (CDO) (602) representative of a network route for evaluation. To derive the route evaluation, the route evaluator obtains a route selection policy (600) that includes a sequence of statements, which the route evaluator proceeds to apply to the CDO (602). The application of the route selection policy (600) onto the CDO (602), in accordance with one or more embodiments of the disclosure, may progress as follows:

A. (FIG. 6A) The route evaluator obtains a CDO (602) for the network route for evaluation, where the CDO (602) specifies a mutable current state namespace (604) (lacking a namespace ID) and an immutable initial state namespace (606) (including a namespace ID of 'input')—both state namespaces are initialized with a same set of name-value pairs for a set of route attributes (e.g., local_pref and med);

B. (FIG. 6B) Statement local_pref=10 is read from the route selection policy (600) and executed; the statement is determined to reflect a route attribute assignment and because the statement lacks a namespace ID, the current state namespace (604) is identified; subsequently, the route attribute named local_pref is identified in the current state namespace (604) and the route attribute value thereof is updated to 10;

C. (FIG. 6C) Statement med=300 is read next from the route selection policy (600) and executed; the statement is determined to reflect a route attribute assignment and because the statement lacks a namespace ID, the current state namespace (604) is identified; subsequently, the route attribute named med is identified in the current state namespace (604) and the route attribute value thereof is updated to 300;

D. (FIG. 6D) Statement gen_attr_snapshot('foo') is read next from the route selection policy (600) and executed; the statement is determined to reflect a route attribute snapshot call, which specifies a new namespace ID foo; as a result of the statement, an immutable new state namespace (608) is created and is initialized with the new namespace ID foo; the new state namespace (608) is subsequently populated with a copy of the same set of name-value pairs for the set of route attributes currently found in the current state namespace (604); the CDO (602) is then updated to include the new state namespace (608);

E. (FIG. 6E) Statement local_pref=med is read next from the route selection policy (600) and executed; the statement is determined to reflect a route attribute assignment (entailing the key local_pref), where the route attribute assignment is contingent on a route attribute lookup (entailing the key med) (where the route attribute lookup is also considered an expression associated with the route attribute assignment); further, because the keys of the route attribute assignment, and the route attribute lookup, lack a namespace ID, the current state namespace (604) is identified; subsequently, a first route attribute named local_pref is identified in the current state namespace (604) and the route attribute value thereof is updated to the expression result of the expression, where the expression result includes the retrieval of the route attribute value (i.e., 300) for a second route attribute named med in the current state namespace (604);

F. (FIG. 6F) Statement local_pref=input.med is read next from the route selection policy (600) and executed; the statement is determined to reflect a route attribute assignment (entailing the key local_pref), where the route attribute assignment is contingent on a route attribute lookup (entailing the key input.med) (where the route attribute lookup is also considered an expression associated with the route attribute assignment); further, because the key of the route attribute assignment lacks a namespace ID, a first route attribute named local_pref in the current state namespace (604) is identified and a route attribute value thereof is updated to the expression result of the expression, where the expression result includes the retrieval of the route attribute value (i.e., 200) for a second route attribute named med in the initial state namespace (606) (because the key of the route attribute lookup specifies the namespace ID input);

G. (FIG. 6G) Statement med=foo.med+300 is read next from the route selection policy (600) and executed; the statement is determined to reflect a route attribute assignment (entailing the key med), where the route attribute assignment is contingent on a route attribute lookup (entailing the key foo.med) (where the route attribute lookup is also considered an expression associated with the route attribute assignment); further, because the key of the route attribute assignment lacks a namespace ID, a first route attribute named med in the current state namespace (604) is identified and a route attribute value thereof is updated to the expression result of the expression, where the expression result includes a summation of the retrieval of the route attribute value (i.e., 300) for a second route attribute named med in the new state namespace (608) (because the key of the route attribute lookup specifies the namespace ID foo) and a constant numerical value (i.e., 300); and H. (FIG. 6H) Statement return true is read from the route selection policy (600) and executed; the statement permits the network route to be installed in the routing information base (RIB) of the network device.

In the above description, numerous details are set forth as examples of embodiments described herein. It will be understood by those skilled in the art, and having the benefit of this Detailed Description, that one or more embodiments of embodiments described herein may be practiced without these specific details and that numerous variations or modifications may be possible without departing from the scope of the embodiments described herein. Certain details known to those of ordinary skill in the art may be omitted to avoid obscuring the description.

In the above description of the figures, any component described with regard to a figure, in various embodiments described herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

While the disclosure has been described with respect to a limited number of embodiments, those skilled in the art, having benefit of this disclosure, will appreciate that other embodiments can be devised which do not depart from the scope of the disclosure as disclosed herein. Accordingly, the scope of the disclosure should be limited only by the attached claims.

What is claimed is:

1. A network device for evaluating network routes, the network device comprising:
   a computer processor;
   memory operatively connected to the computer processor, and comprising a context data object (CDO);
   a routing protocol agent executing on the computer processor; and
   a route evaluator operatively connected to the routing protocol agent and also executing on the computer processor,
   wherein the routing protocol agent is configured to perform a first method, the first method comprising:
      receiving a protocol update message comprising a set of name-value pairs for a set of route attributes descriptive of a network route;
      creating a current state namespace and an initial state namespace;
      populating each of the current and initial state namespaces using the set of name-value pairs for the set of route attributes;
      enclosing the current and initial state namespaces within the CDO; and
      passing the CDO to the route evaluator,
   wherein the route evaluator is configured to perform a second method, the second method comprising:
      obtaining the CDO from the routing protocol agent;
      deriving, for the network route, a route evaluation through application of a route selection policy on the CDO; and
      performing, to the network route, a route action based on the route evaluation.

2. The network device of claim 1, the network device further comprising:
   persistent storage operatively connected to the computer processor, and comprising a routing information base (RIB),
   wherein the route action comprises programming the RIB to include the network route, or discarding the network route.

3. The network device of claim 1, wherein the network device is a switch, a router, or a multilayer switch.

4. A method for evaluating network routes, the method comprising:
   obtaining a context data object (CDO) associated with a network route;
   deriving, for the network route, a route evaluation through application of a route selection policy on the CDO; and
   performing, to the network route, a route action based on the route evaluation,
   wherein the CDO comprises a current state namespace specifying a set of current route attribute values for a set of route attributes descriptive of the network route, and an initial state namespace specifying a set of initial route attribute values for the set of route attributes.

5. The method of claim 4, wherein the route action comprises programming a routing information base (RIB) to include the network route, or discarding the network route.

6. The method of claim 4, wherein the current state namespace either lacks a namespace identifier (ID) or comprises a current namespace ID, whereas the initial state namespace comprises an initial namespace ID.

7. The method of claim 6, wherein the route selection policy comprises a route attribute lookup specifying a key, wherein to process the route attribute lookup, the method further comprises:
making a determination that the key either lacks the namespace ID or comprises the current namespace ID;
identifying, based on the determination, a name-value pair for a route attribute listed in the current state namespace,
wherein a route attribute name of the name-value pair for the route attribute matches the key; and
retrieving a route attribute value of the name-value pair for the route attribute.

8. The method of claim 6, wherein the route selection policy comprises a route attribute lookup specifying a key, wherein to process the route attribute lookup, the method further comprises:
making a determination that the key comprises the initial namespace ID;
identifying, based on the determination, a name-value pair for a route attribute listed in the initial state namespace, wherein a route attribute name of the name-value pair for the route attribute matches an ID-less portion of the key; and
retrieving a route attribute value of the name-value pair for the route attribute.

9. The method of claim 6, wherein the route selection policy comprises a route attribute assignment specifying a key and an expression, wherein to process the route attribute assignment, the method further comprises:
making a determination that the key either lacks the namespace ID or comprises the current namespace ID;
identifying, based on the determination, a name-value pair for a route attribute listed in the current state namespace,
wherein a route attribute name of the name-value pair matches the key; and
updating a route attribute value of the name-value pair for the route attribute based on an expression result of the expression.

10. The method of claim 9, wherein the expression comprises a route attribute lookup specifying a second key, which when processed by the route evaluator, enables the route evaluator to retrieve a second route attribute value of a second name-value pair for a second route attribute in order to produce the expression result.

11. The method of claim 10, wherein the second name-value pair for the second route attribute is listed in the current state namespace, wherein a second route attribute name of the second name-value pair for the second route attribute matches the second key.

12. The method of claim 10, wherein the second name-value pair for the second route attribute is listed in the initial state namespace, wherein a second route attribute name of the second name-value pair for the second route attribute matches an ID-less portion of the second key.

13. The method of claim 6, wherein the route selection policy comprises a route attribute assignment specifying a key and an expression, wherein to process the route attribute assignment, the method further comprises:
making a determination that the key comprises the initial namespace ID;
identifying, based on the determination, a name-value pair for a route attribute listed in the initial state namespace, wherein a route attribute name of the name-value pair for the route attribute matches an ID-less portion of the key; and
updating a route attribute value of the name-value pair for the route attribute based on an expression result of the expression.

14. The method of claim 4, wherein the route selection policy comprises a route attribute snapshot call specifying a new_namespace_ID, wherein to process the route attribute snapshot call, the method further comprises:
creating a new state namespace comprising the new_namespace_ID;
copying, from the current state namespace, the set of current route attribute values for the set of route attributes into the new state namespace; and
updating the CDO to include the new state namespace.

15. The method of claim 4, wherein the CDO further comprises an intermediate state namespace specifying a set of intermediate route attribute values for the set of route attributes, wherein the intermediate state namespace comprises an intermediate namespace identifier (ID).

16. The method of claim 15, wherein the route selection policy comprises a route attribute lookup specifying a key, wherein to process the route attribute lookup, the method further comprises:
making a determination that the key comprises the intermediate namespace ID;
identifying, based on the determination, a name-value pair for a route attribute listed in the intermediate state namespace,
wherein a route attribute name of the name-value pair for the route attribute matches an ID-less portion of the key; and
retrieving a route attribute value of the name-value pair for the route attribute.

17. The method of claim 15, wherein the route selection policy comprises a route attribute assignment specifying a key and an expression, wherein to process the route attribute assignment, the method further comprises:
making a determination that the key comprises the intermediate namespace ID;
identifying, based on the determination, a name-value pair for a route attribute listed in the intermediate state namespace,
wherein a route attribute name of the name-value pair for the route attribute matches an ID-less portion of the key; and
updating a route attribute value of the name-value pair for the route attribute based on an expression result of the expression.

18. A non-transitory computer readable medium (CRM) comprising computer readable program code, which when executed by a computer processor, enables the computer processor to perform a method, the method comprising:
obtaining a context data object (CDO) associated with a network route;
deriving, for the network route, a route evaluation through application of a route selection policy on the CDO; and
performing, to the network route, a route action based on the route evaluation, wherein the CDO comprises a current state namespace specifying a set of current route attribute values for a set of route attributes descriptive of the network route, and an initial state namespace specifying a set of initial route attribute values for the set of attributes.

19. The non-transitory CRM of claim 18, wherein the route action comprises programming a routing information base (RIB) to include the network route, or discarding the network route.

20. The non-transitory CRM of claim 18, wherein the current state namespace either lacks a namespace identifier (ID) or comprises a current namespace ID, whereas the initial state namespace comprises an initial namespace ID.

* * * * *